United States Patent
Shiue et al.

(10) Patent No.: US 6,637,890 B1
(45) Date of Patent: Oct. 28, 2003

(54) SMALL REFLECTIVE TYPE LIQUID CRYSTAL PROJECTION DEVICE

(75) Inventors: Shin Gwo Shiue, Hsinchu Hsien (TW); Mang Ou-Yang, Hsinchu (TW); Jim Chung, Pingjen (TW); I-Pen Chien, Tao-Yuan Hsien (TW)

(73) Assignee: K Laser Technology, Inc., Hsinchu (TW)

( * ) Notice: Subject to any disclaimer, the term of this patent is extended or adjusted under 35 U.S.C. 154(b) by 0 days.

(21) Appl. No.: 10/141,065

(22) Filed: May 9, 2002

(51) Int. Cl.[7] .................. G03B 21/00; G03B 21/14; G03B 21/28; G02F 1/1335
(52) U.S. Cl. .................. 353/31; 353/20; 353/33; 353/81; 349/9
(58) Field of Search .................. 353/20, 31, 34, 353/37, 81, 82, 98, 99, 33; 349/5, 7, 8, 9

(56) References Cited

U.S. PATENT DOCUMENTS 5,772,299 A * 6/1998 Koo et al. .................. 353/20
6,345,895 B1 * 2/2002 Maki et al. .................. 353/33
6,429,906 B1 * 8/2002 Sekine et al. .................. 349/9
6,439,725 B1 * 8/2002 Na .................. 353/31

* cited by examiner

Primary Examiner—Rodney Fuller
Assistant Examiner—Melissa J. Koval
(74) Attorney, Agent, or Firm—Rosenberg, Klein & Lee

(57) ABSTRACT

The present invention provides a small reflective type liquid crystal projection device, which comprises an X-prism, three PBSs, two dichroic mirrors, at least three totally reflective mirrors, three reflective type liquid crystal plates, and a projection object lens. The present invention uses the X-prism matched with the three PBSs and a newly invented 3D light projection system to combine polarized light beams of the three primary colors into one, hence accomplishing the highest use efficiency and the design of light splitting and combining paths and color separating and combining. The reflective type liquid crystal projection device of the present invention has both the advantages of small volume and reduced cost.

7 Claims, 2 Drawing Sheets

SMALL REFLECTIVE TYPE LIQUID CRYSTAL PROJECTION DEVICE

FIELD OF THE INVENTION

The present invention relates to a liquid crystal projection system and, more particularly, to a liquid crystal projection optical system adopting reflective type of liquid crystal display.

BACKGROUND OF THE INVENTION

General reflective type liquid crystal projection optical engines have different architectures. For example, companies such as JVC, Philips, Color Link, RDI, and Aurora System produce reflective type liquid crystal projection devices of different structures. Almost all the structures adopt an X-prism. Color Link and RDI adopt their own color selectors to achieve the object of light-splitting projection.

Generally, reflective type liquid crystal projection devices mainly adopt the X-prism architecture to let the three primary colors of red (R), green (G), and blue (B) enter three different sets of polarization beam splitter (PBS) and then combine together. Three light beams are the common design idea. They differ only in variation of light projection system. Different light projection systems have different usage efficiencies of light energy and sizes of occupied volume. However, the above projection devices have more complicated structures, and thus have the disadvantages of large volume and higher cost. Moreover, the highest usage efficiency of the three primary colors of R, G, and B cannot be accomplished.

Accordingly, the present invention aims to propose a reflective type liquid crystal projection device, which can shrink the volume of optical system to shorten the distance of incident polarized light to the reflective type LCD, thereby effectively enhancing the imaging quality of projection device and reducing the cost.

SUMMARY AND OBJECTS OF THE PRESENT INVENTION

The primary object of the present invention is to propose a small reflective type liquid crystal projection device, which uses an X-prism matched with a newly invented 3D light projection system to combine polarized light beams of the three primary colors of R, G, and B into a single light beam so as to achieve the highest use efficiency.

Another object of the present invention is to propose a reflective type liquid crystal projection device having both the advantages of small volume and reduced cost.

To achieve the above objects, the present invention comprises an incident light source for providing a parallel incident light, which passes through a diffusive mirror set and a collective mirror set and is then converted into an S-polarization light. A first PBS is then used to split the S-polarization light into three light beams of the three primary colors, which are respectively reflected and transmitted. After at least three totally reflective mirrors arranged in 3D space reflect the third primary color to the first PBS and reflect the first and second primary colors to a second dichromatic mirror, the two primary colors are projected toward a second PBS and a third PBS, respectively. Next, after three reflective type liquid crystal plates convert the three primary colors reflected by the PBSs into P-polarization lights, which are transmitted through the PBSs and then combined at an X-prism to obtain an output light beam. Finally, the output light beam is projected to a screen by a projection object lens.

The various objects and advantages of the present invention will be more readily understood from the following detailed description when read in conjunction with the appended drawings, in which:

DETAILED DESCRIPTION OF PREFERRED EMBODIMENT

The present invention uses an X-prism, three PBSs, two dichroic mirrors, at least three totally reflective mirrors, three reflective type liquid crystal plates, and a projection object lens to accomplish the design of light splitting and combining paths and color separating and combining of reflective type liquid crystal projection device.

The incident light source of the present invention is a uniform and linearly polarized parallel incident light. This incident light can be a single S-polarization light or a single P-polarization light. The function and characteristic of the present invention will be illustrated below with an S-polarization parallel incident light.

Figure 1:
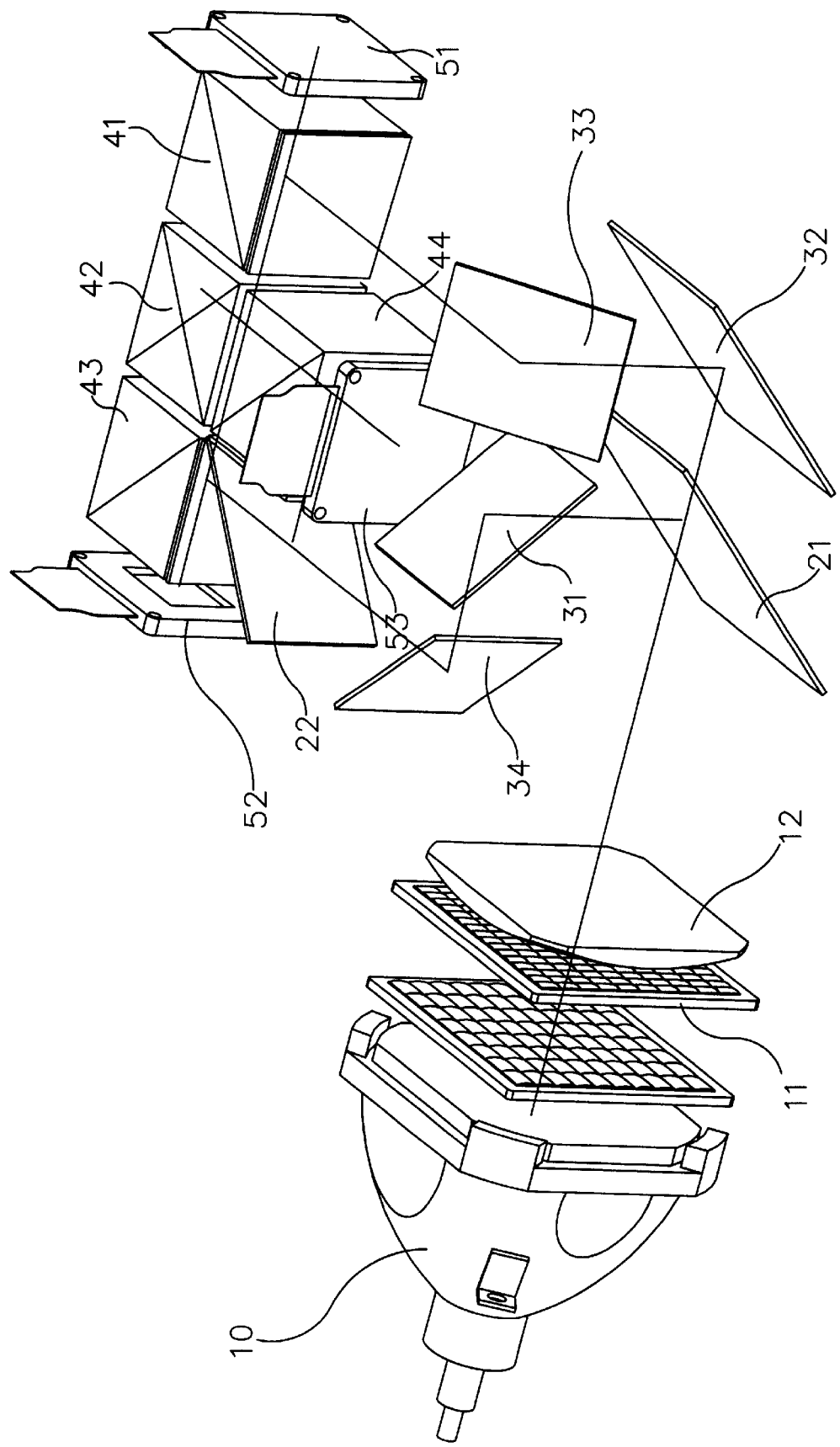
FIG. 1 is a perspective structure diagram according to an embodiment of the present invention.

As shown in FIG. 1, a reflective type liquid crystal projection device comprises an incident light source 10 for providing a parallel incident light beam, which is projected to a diffusive mirror set 11 and a collective mirror set 12. The function of the diffusive mirror set is to convert the incident light into a single S-polarization light beam and then separate the light beam into many small light beams, which are then combined by the collective mirror set 12 to achieve the object of diffusing light.

After the S-polarization light beam passes through the collective mirror set 12, it will be converged and projected to a first dichroic mirror 21, whose function is to reflect two primary colors of the S-polarization light to a first totally reflective mirror 31 in 90 degrees upwards and to let the third primary color be transmitted. The third primary color passing through the first PBS will be projected to a second totally reflective mirror 32 and then reflected to a third totally reflective mirror 33. The third totally reflective mirror 33 is deflected 90 degrees to reflect the third primary color to a first PBS 41, whose function is to reflect in 45 degrees the S-polarization light of the third primary color incident in 45 degrees to a first reflective type liquid crystal plate 51, which will rotate the phase of the incident S-polarization light 90 degrees to convert it into a P-polarization light. The P-polarization light is then incident into the first PBS 41, whose function is to only let the P-polarization light be transmitted. Finally, the third primary color light beam of P-polarization is projected to an X-prism 42.

The first totally reflective mirror 31 is tilted 45 degrees to form a slanting angle with the first dichroic mirror 21. After the first dichroic mirror 21 reflects the first and second primary color to the first totally reflective mirror 31 in 90 degrees upwards, the S-polarization light of the first and second primary colors is projected to a fourth totally reflective mirror 34, whose function is to reflect the first and second primary colors to a second dichroic mirror 22 to let the first primary color be transmitted and to reflect the second primary color. The first primary light and second primary color will be respectively incident into a second PBS 43 and a third PBS 44, whose functions are the same as that of the first PBS 42, i.e., reflecting the S-polarization light and letting the P-polarization light be transmitted.

Therefore, the S-polarization lights of the first and second primary colors will be reflected to a second reflective type liquid crystal plate 52 and a third reflective type liquid crystal plate by the second PBS 43 and the third PBS 44, respectively. The two reflective type liquid crystal plates 52 and 53 will rotate the S-polarization light 90 degrees to convert it into a P-polarization light. The converted P-polarization lights of the first and second primary colors will be transmitted through the second PBS 43 and the third PBS 44 to be incident into the X-prism 42, respectively. Finally, the three primary color lights will combine at the X-prism 42 to be assembled into an output light beam, which is projected to a screen to form an image by a projection object lens.

Each of the above three PBSs 41, 43, and 44 is formed by gluing two isosceles right triangular prisms (with interior angles of 45-90-45 degrees) to obtain a square prism set. The hypotenuse face of the isosceles right triangular prism is coated with a dielectric thin film. The dielectric thin film is between the two prisms. The characteristic of the dielectric thin film is to reflect a primary color light or let it be transmitted.

Figure 2:
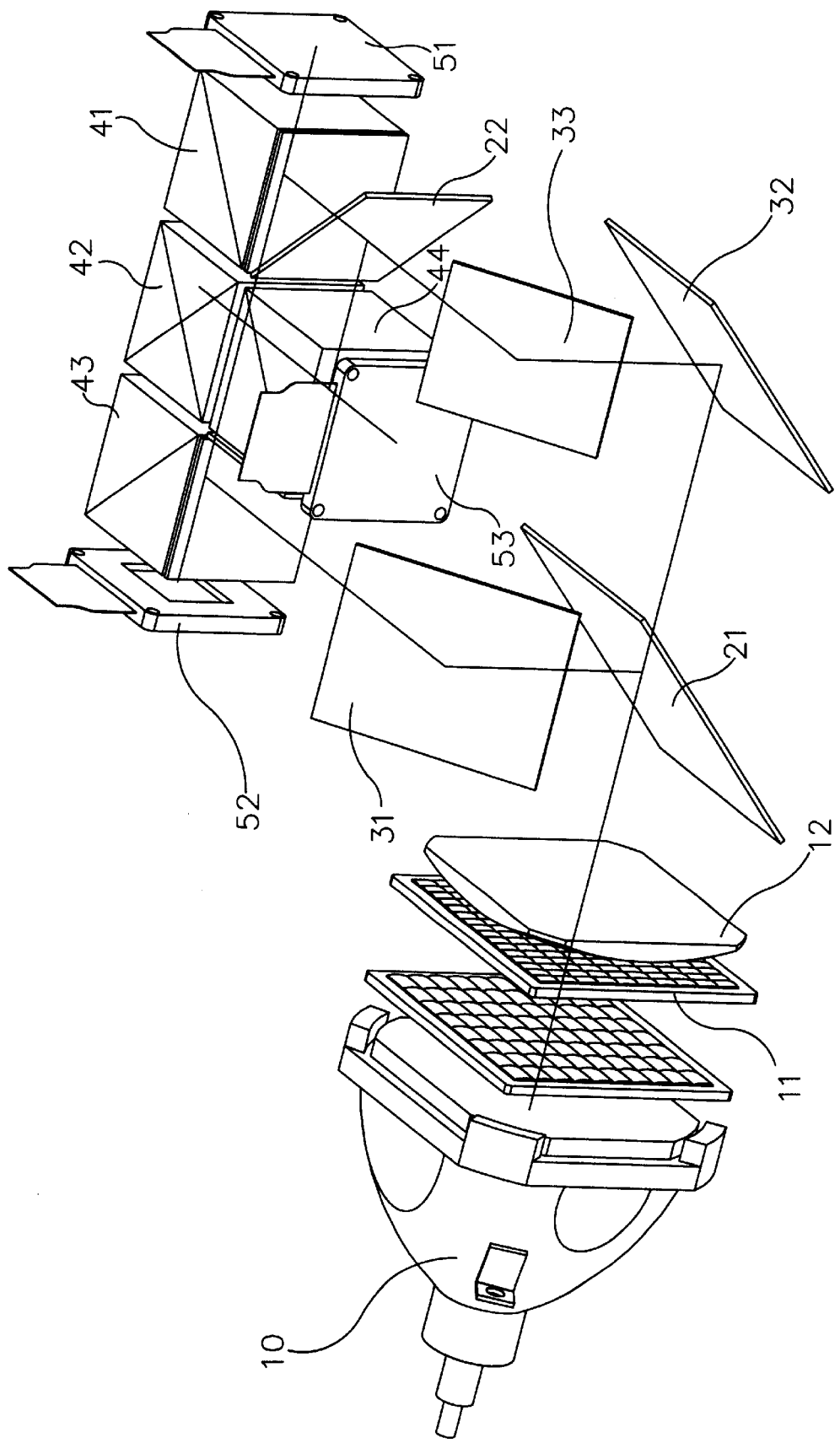
FIG. 2 is a diagram according to another embodiment of the present invention.

FIG. 2 is a diagram according to another embodiment of the present invention, wherein three totally reflective mirrors are used. As shown in FIG. 2, after the S-polarization light beam passes through the diffusive mirror set 11 and the collective mirror set 12, it will be converged and projected to the first dichroic mirror 21, whose function is to let two primary colors of the S-polarization light be transmitted and to reflect the third primary color to the first totally reflective mirror 31 in 90 degrees upwards. The first totally reflective mirror 31 is tilted 45 degrees to form a slanting angle of 45 degrees with the first dichroic mirror 21 so as to project the third primary color light beam to the second PBS 43, whose function is to reflect in 45 degrees the S-polarization light of the third primary color incident in 45 degrees to the second reflective type liquid crystal plate 52, which will rotate the phase of the incident S-polarization light 90 degrees to convert it into a P-polarization light. The P-polarization light is then incident into the second PBS 43 project the third primary color light beam of P-polarization to the X-prism 42.

Additionally, the S-polarization light of the first and second primary colors will pass through the first dichroic mirror 21 and be projected to the second totally reflective mirror 32, which will reflect the first and second primary color lights upwards to the third totally reflective mirror 33. The function of the third totally reflective mirror 33 is to reflect the first and second primary color lights to the second dichroic mirror 22, which will let the first primary color light be transmitted and reflect the second primary color light. The first and second primary color lights will be incident into the first PBS 41 and the third PBS 44, respectively.

Next, the S-polarization lights of the first and second primary colors will be reflected to the first reflective type liquid crystal plate 51 and the third reflective type liquid crystal plate 53 by the first PBS 41 and the second PBS 44, respectively. The two reflective type liquid crystal plates 51 and 53 will convert the S-polarization light into a P-polarization light to let the first primary color light and the second primary color light of P-polarization respectively pass through the first PBS 41 and the third PBS 44 and then be incident into the X-prism. Finally, the three primary color lights will combine at the X-prism to be assembled into an output light beam for projecting out.

To sum up, the present invention uses an X-prism matched with three PBSs and a newly invented 3D light projection system to combine polarized light beams of the three primary colors into one, hence accomplishing the highest usage efficiency. The reflective type liquid crystal projection device of the present invention has both the advantages of small volume and reduced cost.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A small reflective type liquid crystal projection device, comprising:

an incident light source for providing a parallel incident light;

a diffusive mirror set and a collective mirror set for converting said incident light into a linearly polarized light;

a first dichroic mirror for separating said linearly polarized light into three primary color lights, which are divided into two groups to be reflected and transmitted, respectively;

at least three totally reflective mirrors arranged in 3D space, with at least a pair of said totally reflective mirrors being disposed on a plane vertically offset from the other of said totally reflective mirrors, for reflecting a primary color light to a first polarizing beam splitter and reflecting the other two primary color lights to a second dichroic mirror, which projects said other two primary color lights to a second polarizing beam splitter and a third polarizing beam splitter, respectively;

three reflective type liquid crystal plates respectively situated behind said first, second, and third polarizing beam splitters and used to convert the three primary color lights into lights of opposite polarization, which then pass through said polarizing beam splitters, respectively;

an X-prism for combining the three primary color lights passing through said first, second, and third polarizing beam splitters into an output light beam; and a projection object lens for projecting out said output light beam.

2. The reflective type liquid crystal projection device as claimed in claim 1, wherein each of said first, second, and third polarizing beam splitters comprises two glued isosceles right triangular prisms and a dielectric thin film formed between said two prisms.

3. The reflective type liquid crystal projection device as claimed in claim 1, wherein said linearly polarized light can be an S-polarization light or a P-polarization light.

4. The reflective type liquid crystal projection device as claimed in claim 1, wherein said first dichroic mirror reflects one of the three primary color lights and lets the other two primary color lights be transmitted.

5. A reflective type liquid crystal projection device comprising:

an incident light source for providing a parallel incident light;

a diffusive mirror set and a collective mirror set for converting said incident light into a linearly polarized light;

a first dichroic mirror for separating said linearly polarized light into three primary color lights, which are divided into two groups to be reflected and transmitted, respectively;

at least three totally reflective mirrors arranged in 3D space for reflecting a primary color light to a first polarizing beam splitter and reflecting the other two primary color lights to a second dichroic mirror, which projects said other two primary color lights to a second polarizing beam splitter and a third polarizing beam splitter, respectively; wherein at least one of said first and second dichroic mirrors transmits one of the three primary color lights and reflects the other two primary color lights;

three reflective type liquid crystal plates respectively situated behind said first, second, and third polarizing beam splitters and used to convert the three primary color lights into lights of opposite polarization, which then pass through said polarizing beam splitters, respectively;

an X-prism for combining the three primary color lights passing through said first, second, and third polarizing beam splitters into an output light beam; and a projection object lens for projecting out said output light beam.

6. The reflective type liquid crystal projection device as claimed in claim 5, wherein each of said first, second, and third polarizing beam splitters comprises two glued isosceles right triangular prisms and a dielectric thin film formed between said two prisms.

7. The reflective type liquid crystal projection device as claimed in claim 5, wherein said linearly polarized light is one of an S-polarized and P-polarized light types.

* * * * *